(12) United States Patent
Kim et al.

(10) Patent No.: US 8,804,167 B2
(45) Date of Patent: Aug. 12, 2014

(54) IMAGE SCANNING APPARATUS AND METHOD THEREOF

(75) Inventors: Ki-hun Kim, Suwon-si (KR); Soo-jin Ji, Anyang-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1161 days.

(21) Appl. No.: 12/540,811

(22) Filed: Aug. 13, 2009

(65) Prior Publication Data

US 2010/0097640 A1   Apr. 22, 2010

(30) Foreign Application Priority Data

Oct. 22, 2008   (KR) .......................... 10-2008-0103814

(51) Int. Cl.
*G06F 15/00* (2006.01)
*H04N 1/04* (2006.01)

(52) U.S. Cl.
USPC ......... 358/1.15; 358/1.18; 358/401; 358/497; 358/498

(58) Field of Classification Search
USPC ................ 358/1.15, 1.18, 486, 497, 498, 450
See application file for complete search history.

(56) References Cited

U.S. PATENT DOCUMENTS

| | | | |
|---|---|---|---|
| 8,284,464 B2 * | 10/2012 | Nakashita ...................... | 358/498 |
| 2002/0141660 A1 * | 10/2002 | Bellavita et al. .............. | 382/309 |
| 2004/0100669 A1 * | 5/2004 | Tecu et al. ...................... | 358/497 |
| 2004/0252355 A1 * | 12/2004 | Chen ............................. | 358/497 |
| 2005/0128527 A1 * | 6/2005 | Brawn et al. ................... | 358/401 |
| 2005/0281598 A1 * | 12/2005 | Hattori et al. .................. | 399/405 |
| 2006/0085516 A1 * | 4/2006 | Farr et al. ....................... | 709/217 |
| 2006/0133844 A1 * | 6/2006 | Konno ............................ | 399/82 |
| 2006/0158701 A1 * | 7/2006 | Park et al. ...................... | 358/498 |
| 2006/0268362 A1 * | 11/2006 | Bridges et al. ................ | 358/450 |

* cited by examiner

*Primary Examiner* — Allen H Nguyen
(74) *Attorney, Agent, or Firm* — Stanzione & Kim, LLP

(57) ABSTRACT

Image scanning apparatus and method of receiving a new scan job, determining whether the new scan job is a multi-scan job, and when the new scan job is a multi-scan job, individually performing the multi-scan job using the plurality of scan units. Accordingly, in the process of performing a scan job, a user can perform a new scan job without waiting.

16 Claims, 5 Drawing Sheets

IMAGE SCANNING APPARATUS AND METHOD THEREOF

CROSS-REFERENCE TO RELATED APPLICATIONS

This application claims priority under 35 U.S.C. §119 (a) from Korean Patent Application No. 10-2008-103814, filed on Oct. 22, 2008, in the Korean Intellectual Property Office, the disclosure of which is incorporated herein by reference in its entirety.

BACKGROUND

1. Field of the Invention

The present general inventive concept relates to an image scanning apparatus and a method thereof, and more particularly, to an image scanning apparatus capable of individually controlling a plurality of scan units and performing scan jobs in parallel to each other if a user inputs a multi-scan job, and a method thereof.

2. Description of the Related Art

An image scanning apparatus refers to an apparatus that scans an original image such as a document, picture, and film and converts it into a digital image. In the image scanning apparatus, digital data can be displayed on the monitor of a computer or printed as an output image by a printer. Such an image scanning apparatus may be a scanner, photocopier, facsimile machine, or multifunction peripheral (MFP) integrating the functions of foregoing devices into a single device.

Recently, the image scanning apparatus such as a scanner, facsimile machine and digital photocopier employs an auto document feeder (ADF) to scan documents which are successively fed. Also, the image scanning apparatus employs a dual auto document feeder (DADF) having a plurality of scan units to automatically scan both sides of document.

However, although the image scanning apparatus has a plurality of scan units, it cannot perform one scan job in parallel to another scan job. That is, in order to perform a new scan job, a user should wait until a current scan job is completed.

SUMMARY

Example embodiments of the present general inventive concept provide an image scanning apparatus to individually control a plurality of scan units and to perform scan jobs in parallel to each other if a user inputs a multi-scan job, and a method thereof.

Additional embodiments of the present general inventive concept will be set forth in part in the description which follows and, in part, will be obvious from the description, or may be learned by practice of the general inventive concept.

Example embodiments of the present general inventive concept may be achieved by providing an image scanning method of an image scanning apparatus which includes a plurality of scan units, the method including receiving a new scan job, determining whether the new scan job is a multi-scan job, and when the new scan job is a multi-scan job, individually performing the multi-scan job using the plurality of scan units.

The multi-scan job may include at least one of a scan job, a fax transmission job, and a copy job which uses an ADF while performing another scan job using a flatbed scanner.

The receiving the new scan job may include receiving at least one of the scan job, the fax transmission job, and the copy job which uses the ADF while performing another scan job using the flatbed scanner.

The determining may include, in performing a scan job using one of the plurality of scan units, when at least one different scan job is received or if a multi-scan job which can be provided by the image scanning apparatus is selected, determining that the new scan job is a multi-scan job.

The image scanning method may further include displaying information indicating whether the new scan job is a multi-scan job for a user.

The image scanning method may further include printing at least one of scan data that is scanned by the plurality of scan units.

The printing may include printing scan data that is scanned by one of the plurality of scan units on one side of a printing medium and printing scan data that is scanned by at least one of the other scan units on the other side of the printing medium.

The printing may include printing scan data scanned by one of the plurality of scan units and scan data scanned by at least one of the other scan units on a single side of a printing medium.

The printing may include obtaining scan data that is scanned by one of the plurality of scan units as a form document and printing an ID for the scan data that is scanned by at least one of other scan units on the form document.

Example embodiments of the present general inventive concept may also be achieved by providing an image scanning apparatus including a plurality of scan units, a user interface to receive a new scan job, and a controller to determine whether the new scan job is a multi scan job and to individually perform the multi-scab job using the plurality of scan units.

The multi-scan job may include at least one of a scan job, a fax transmission job, and a copy job which uses an ADF to perform another scan job using a flatbed scanner.

The user interface may receive from a user at least one of the scan job, the fax transmission job, and the copy job which uses the ADF to perform another scan using the flatbed scanner.

In performing a scan job using one of the plurality of scan units, when at least one different scan job is received or when a multi-scan job which can be provided by the image scanning apparatus is selected, the controller may determine that the new scan job is a multi-scan job.

The user interface may display information indicating whether the new scan job is a multi-scan job.

The controller may control at least one of scan data that is scanned by the plurality of scan units to be printed.

The controller may control scan data that is scanned by one of the plurality of scan units to be printed on one side of a printing medium and control scan data that is scanned by at least one of the other scan units to be printed on the other side of the printing medium.

The controller may control scan data that is scanned by one of the plurality of scan units and scan data that is scanned by at least one of the other scan units to be printed on a single side of a printing medium.

The controller may control scan data that is scanned by one of the plurality of scan units to be used as a form document and control an ID for scan data that is scanned by at least one of other scan units to be printed on the form document.

Exemplary embodiments of the present general inventive concept also provide an image scanning apparatus including a first scan unit and a second scan unit, an interface to receive a multi-scan job, and a controller to individually control the first scan unit and the second scan unit to scan different documents such that the received multi-scan job is performed in parallel.

Exemplary embodiments of the present general inventive concept also provide an image scanning method of an image scanning apparatus which includes a first scan unit and a second scan unit, the method including receiving a multi-scan job with an interface, and individually controlling the first scan unit and the second scan unit to scan different documents such that the received multi-scan job is performed in parallel.

Exemplary embodiments of the present general inventive concept also provide an image scanning method of an image scanning apparatus which includes a plurality of scan units, the method including receiving a scan job, determining whether the scan job is a multi-scan job, and when the new scan job is a multi-scan job, individually controlling the plurality of scan units to scan different documents such that the received multi-scan job is performed in parallel.

Exemplary embodiments of the present general inventive concept also provide an image scanning method of an image scanning apparatus which comprises a first scan unit and a second scan unit, the method including scanning an identification document with the first scan unit, and scanning a form document with the second scan unit, detecting a blank area in the scanned form document, and combining the scanned image of the identification document and the form document such that the identification document is positioned in the determined blank area of the form document.

Exemplary embodiments of the present general inventive concept also provide an image scanning apparatus including a first scan unit to scan an identification document, a second scan unit to scan a form document, and a controller to detect a blank area in the scanned form document and to combine the scanned image of the identification document and the form document such that the identification document is positioned in the determined blank area of the form document.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
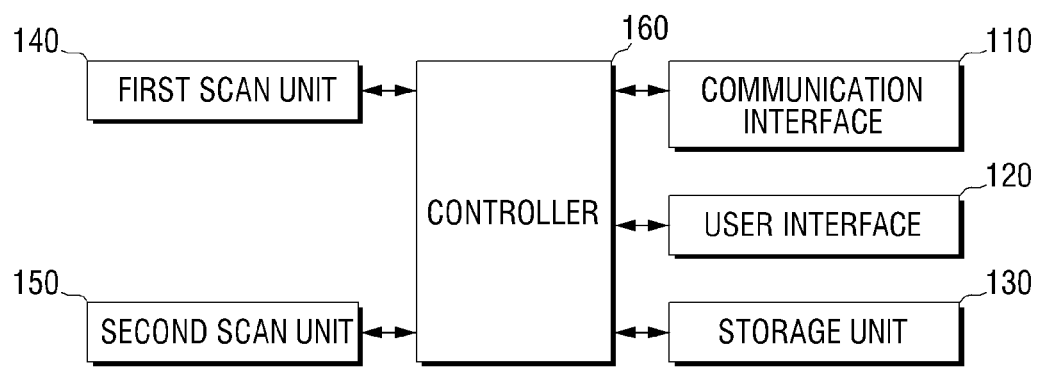
FIG. 1 is a block diagram illustrating an image scanning apparatus according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image scanning apparatus according to an exemplary embodiment of the present general inventive concept. Referring to FIG. 1, an image scanning apparatus 100 may include a communication interface 110, a user interface 120, a storage unit 130, a plurality of scan units 140,150, and a controller 160. Although FIG. 1 illustrates first scan unit 140 and second scan unit 150, additional scan units may be coupled to controller 160.

The communication interface 110 is connected to a terminal device (not illustrated) such as a PC, laptop computer, personal digital assistant (PDA), and digital camera. More specifically, the communication interface 110 is adapted to connect the image scanning apparatus 100 to an external device, and may access the terminal device through a local area network (LAN), or the Internet, or any other suitable communications network. The communication interface 110 may access the terminal device through a universal serial bus (USB) port, or any other suitable serial or parallel interface port.

The user interface 120 may have a plurality of function keys for the user to set or select various functions supported by the image scanning apparatus 100, and displays diverse information provided by the image scanning apparatus 100. The user interface 120 may be implemented as a device such as a touch pad, which enables input and output to be performed simultaneously, and also may be implemented as a device integrating a mouse and a monitor. The user can select a scan job using a user interface window provided through the user interface 120. Also, the user can check whether he/she has selected a multi-scan job or not through the user interface window. The user interface window will be described in greater detail with reference to FIGS. 2 to 3.

The storage unit 130 can store scan data scanned by the image scanning apparatus 100. Also, the storage unit 130 can store various kinds of printing data and form data received from the terminal device (not illustrated) or other devices that may be communicatively coupled to the communication interface 110. The storage unit 130 may be realized as a storage medium internal to the image scanning apparatus 100 or an external storage medium, for example, a removable disk including a USB memory, a storage medium connected to the host, and a web server through the network.

The plurality of scan units 140, 150 may include their respective individual scan modules and image processors to individually scan documents. For the convenience of explanation, the plurality of scan units 140, 150 are divided into a first scan unit 140 to scan a document laid on a flatbed and simultaneously scan one side of document fed to a DADF, and a second scan unit 150 mounted in the DADF to scan the other side of the document fed to the DADF. Alternatively, both the first scan unit 140 and the second scan unit 150 may include a DADF and a plurality of scan units mounted to the DADF.

The controller 160 can determine whether a scan job input through the user interface 120 or the communication interface 110 is a multi-scan job or not. The controller 160 may determine whether a scan job input is a multi-scan job, for example, from header information or other data received via the communication interface 110, the user interface 120, or the storage unit 130. More specifically, in performing scan job using one of the plurality of scan units, if a new scan job is input, the controller 160 determines the new scan job to be a multi-scan job. For example, in performing a scan job using the first scan unit 140, if the user selects a copy job, a fax job or a scan job which uses the second scan unit 150, the newly input scan job is determined to be a multi-scan job. The multi-scan job refers to a job which scans different documents by individually controlling the plurality of scan units. For example, the multi-scan job may include a new scan job, a new fax transmission job, and a new copy job which are performed using an ADF while another scan job is performed using a flatbed scanner.

A multi-scan job provided by the image scanning apparatus 100 may be selected. In this case, the controller 160 determines that a multi-scan job is input. More specifically, if the user selects a pre-defined multi-scan job provided by the image scanning apparatus 100 through the user interface 120, the controller 160 determines that the input scan job is a multi-scan job. The multi-scan job provided by the image forming apparatus 100 will be described in detail with reference to FIG. 3.

The controller 160 controls the user interface 120 to generate a UI (user interface) window to receive a new scan job when performing a scan job using one scan unit. More specifically, in performing a scan job using the first scan unit 140, the controller 160 can receive another job which uses the second scan unit 150, such as a scan job, a fax transmission job, and a copy job using an ADF, through the user interface 120.

The controller 160 controls information regarding whether the input scan job is a multi-scan job or not to be displayed for the user. More specifically, the controller 160 controls the user interface 120 to inform the user of whether the input scan job is a multi-scan job or not. For example, if a currently input scan job requires the second scan unit 150, which is performing a scan job, or if a currently input scan job requires the first scan unit 140 but it is difficult to lay document on the flatbed scanner because the second scan unit 150 is in the process of performing a scan job, the controller 160 controls the user interface 120 to inform that the multi-scan job cannot be allowed. If a multi-scan job is allowed, the controller 160 control the user interface 120 to inform the user of this.

If the input scan job is a multi-scan job or if a pre-defined multi-scan job is selected, the controller 160 may control the use interface 120 to display a notice or message to the user. For example, if the input scan job is scheduled to be performed by the second scan unit 150, a message is displayed, informing the user that documents should be stacked on the DADF in a direction to be scanned by the second scan unit 150.

If the input scan job is a multi-scan job, the controller 160 controls the plurality of scan units individually, thereby performing the multi-scan job in parallel with a job which is being performed. More specifically, in performing a scan job using the first scan unit 140, if a new scan job is input, the controller 160 may control the second scan unit 150 to perform the new scan job in parallel with the job performed by the first scan unit 140. Also, if the user selects a pre-defined multi-scan job provided by the image scanning apparatus 100 through the user interface 120, the controller 160 may control the first scan unit 140 and the second scan unit 150 to scan different documents in parallel with each other.

If the input scan job is not a multi-scan job, the controller 160 may control one of the plurality of scan units 140 and 150 to perform the input scan job. More specifically, if the input scan job is not a multi-scan job, that is, if there is no scan job that is being currently performed or if the input scan job requires the same scan unit (for example, if a currently input scan job requires the second unit 150, which is performing a scan job), the controller 160 may control one of the plurality of scan units 140, 150 to perform a single scan operation.

The controller 160 controls the printing of at least one of scan data that is scanned by the plurality of scan units 140, 150. More specifically, if a newly input scan job is a copy job or a pre-defined multi-scan job which needs to be output, the controller 160 may control a printing engine (not illustrated) to print scan data. The controller 160 may also control elements to feed a printing medium, print or form an image with the scan data at the printing medium, and/or discharge the printing medium.

The controller 160 can perform double-sided printing by printing scan data that is scanned by one of the plurality of scan units 140, 150 on one side of a printing medium and printing scan data that is scanned by at least one of the other scan units on the other side of the printing medium. More specifically, the controller 160 may output a plurality of double-sided copies by controlling the first scan unit 140 to scan a document and controlling the second scan unit 150 to scan a plurality of documents, and then controlling the printing of the scan image data that is scanned by the first scan unit 140 on one side of the printing medium and controlling the printing of the scan image data that is scanned by the second scan unit 150 on the other side of the printing medium.

The controller 160 can also control single-sided printing by printing scan data that is scanned by one of the plurality of scan units and scan data scanned by at least one of the other scan units all on one side of a printing medium. More specifically, the controller 160 may control the output of a plurality of single-sided copies by controlling the first scan unit 140 to scan a document and the second scan unit 150 to scan a plurality of documents and then controlling the printing of scan image data that is scanned by the first scan unit 140 on the left of printing medium and controlling the printing of a plurality of scan images that are scanned by the second scan unit 150 on the right of printing medium.

The controller 140 may use scan data that is scanned by one of the plurality of scan units as a form, and copy scan data that is scanned by at least one of the other scan units to the form (hereinafter, this coping method is referred to as 'ID Copy+ Form' and will be described in detail below).

Figure 4:
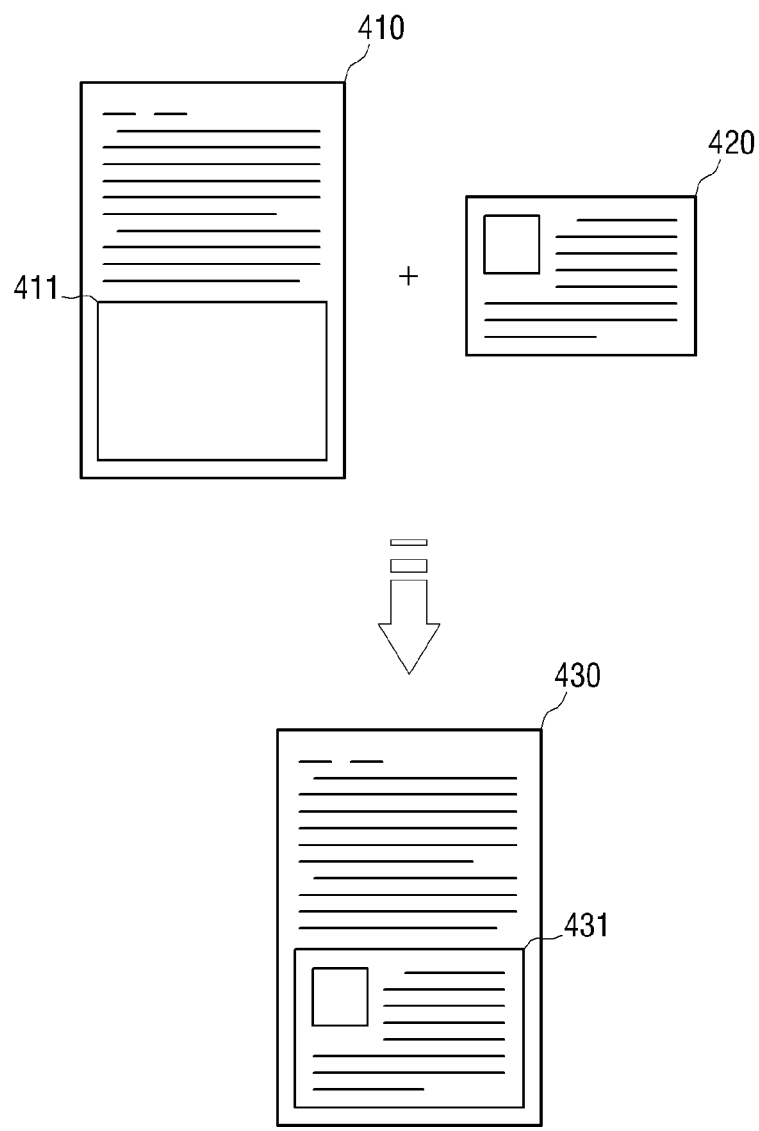
FIG. 4 is a view provided to explain a method for 'ID Copy+Form' according to an exemplary embodiment of the present general inventive concept.

FIG. 4 is a view illustrating the method of 'ID Copy+Form' according to an exemplary embodiment of the present general inventive concept.

Referring to FIG. 4, the first scan unit 140 scans an ID card and the second scan unit 150 scans a form document. A form document image 410 scanned by the second scan unit 150 and an ID card image 420 scanned by the first scan unit 140 are combined such that a single-sided copy 430 in which the ID card image 420 is located in area 431, which was previously a white area 411 of the form document image 410 is output. Herein, information on where the ID card image 420 is located may be input by a user through the user interface 120 and may be calculated by detecting the white area 411 from the form document image 410.

Accordingly, when performing a scan job, the user can perform a new scan job without waiting, and can use diverse pre-defined multi-scan jobs, so that user's convenience can be improved.

Figure 2:
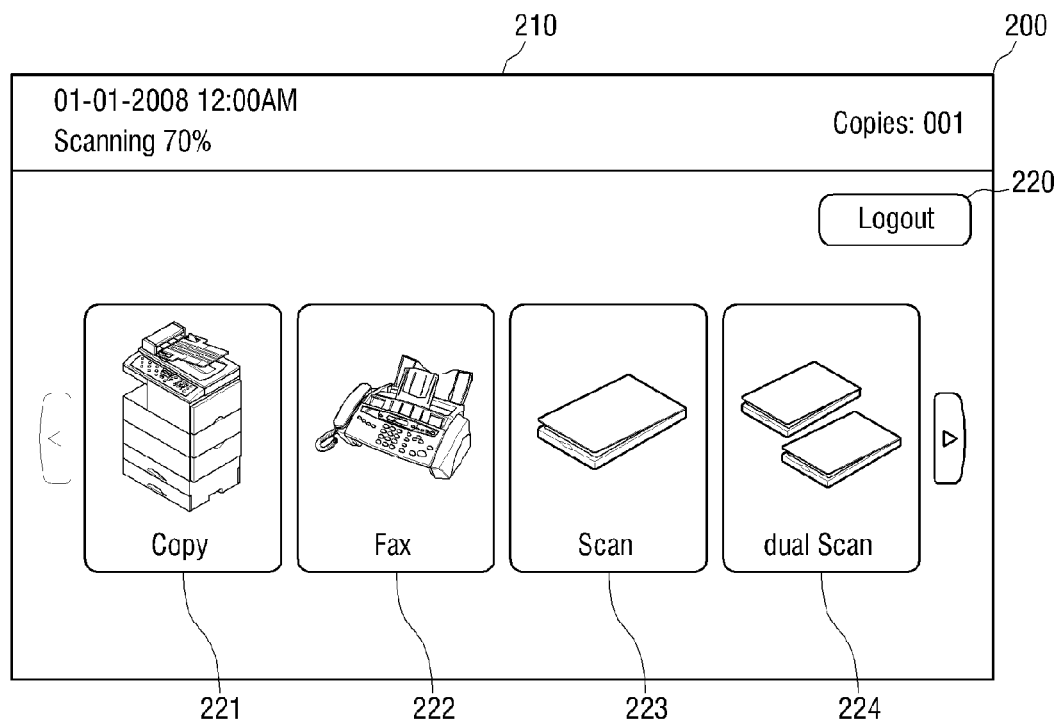
FIGS. 2 and 3 are views illustrating examples of a user interface window of the image scanning apparatus of FIG. 1.
Figure 3:
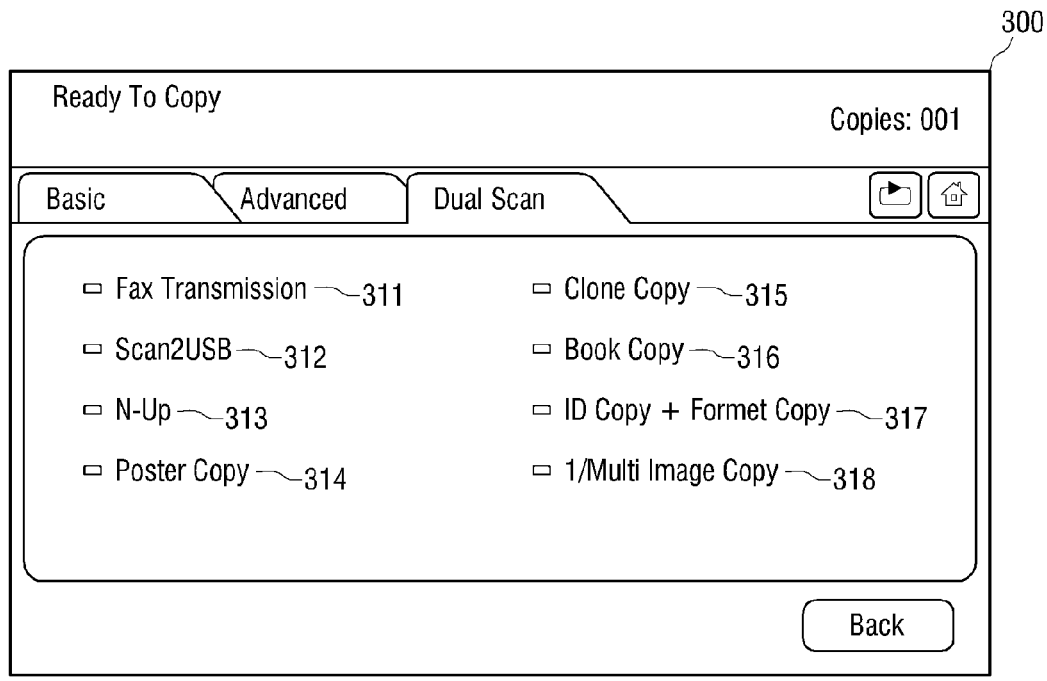

FIGS. 2 and 3 are views illustrating user interface windows displayed on an image scanning apparatus according to an exemplary embodiment of the present general inventive concept.

Referring to FIG. 2, a UI window 200 includes a first area 210 to display a current operation state of the image scanning apparatus and a second area 220 to display diverse jobs that can be selected by the user. More specifically, an image scanning apparatus having a plurality of scan units may control the respective scan units individually to perform multi-scan jobs. That is, the image scanning apparatus may receive a selection of a new job from a user even when the image scanning apparatus is performing another scan job.

The diverse jobs selectable by the user may include a copy job 221, a facsimile job 222, a scan job 223, and a dual scan job 244. More specifically, the copy job 221 is to copy a new document using the scan unit which does not perform a scan operation currently. Although FIG. 2 illustrates the copy job 221, facsimile job 222, scan job 223, and dual scan job 244, other selectable jobs may be displayed that a user may select.

The facsimile job 222 is to facsimile a new document using the scan unit which is not performing a scan operation at the time when the facsimile job 222 is selected. The scan job 223 is to scan a new document using the scan unit which is not performing a scan operation when the scan job 223 is selected.

The dual scan job 224 is a pre-defined multi-scan job which is provided in the image scanning apparatus having two scanning units. If the user selects the dual scan job 224, a UI window illustrated in FIG. 3 is displayed.

FIG. 3 illustrates a user interface window (UI) displayed if the user selects the dual scan job 224 illustrated in FIG. 2.

Referring to FIG. 3, a UI window 300 displays a list of multi-scan jobs that can be provided by the image scanning apparatus 100. More specifically, if the user selects the dual scan job, pre-defined multi-scan jobs 311-318 that can be provided by the image scanning apparatus 100 are displayed.

Briefly, the dual scan job selectable by the user includes 'Fax Transmission' 311, 'Scan2USB' 312, 'N-up' 313, 'Poster Copy' 314, 'Clone Copy' 315, 'Book Copy 316, 'IDCopy+Form Copy' 317, and '1/Multi Image Copy' 318. More specifically, the jobs 'Fax Transmission' 311, 'Scan2USB' 312, 'N-up' 313, 'Poster Copy' 314, 'Clone Copy' 315, and 'Book Copy' 316 are similar to jobs provided by a general image scanning apparatus, but differ from those in that each job is performed individually when another job is being performed in a single scan unit. However, the output result of each job is same as in a conventional one and detailed description thereof will be omitted.

The job 'ID Copy+Form Copy' is a multi-scan job that is performed if an ID card is laid on a flatbed type scan unit and a document of specific form is laid on an ADF. More specifically, the form document laid on the ADF is scanned and the ID card is scanned by the flatbed scan unit, so that a combined image including the ID card image located on one side of the form image is output.

The job '1/Multi Image Copy' is a multi-scan job that is performed by scanning a first document using a scan unit placed in a flatbed and scanning a plurality of second documents using a scan unit placed in a ADF. As a result, the first document is copied to one side of a printing medium and the plurality of second documents is copied to the other side of the printing medium.

In FIGS. 1 to 4, the plurality of scan units includes the first scan unit 140 and the second scan unit 150. However, a single scan unit may be provided in a flatbed and two scan units may be provided in a DADF. Alternatively, a single scan unit may be provided in a flatbed and a single unit or four or more scan units may be provided in a DADF.

Figure 5:
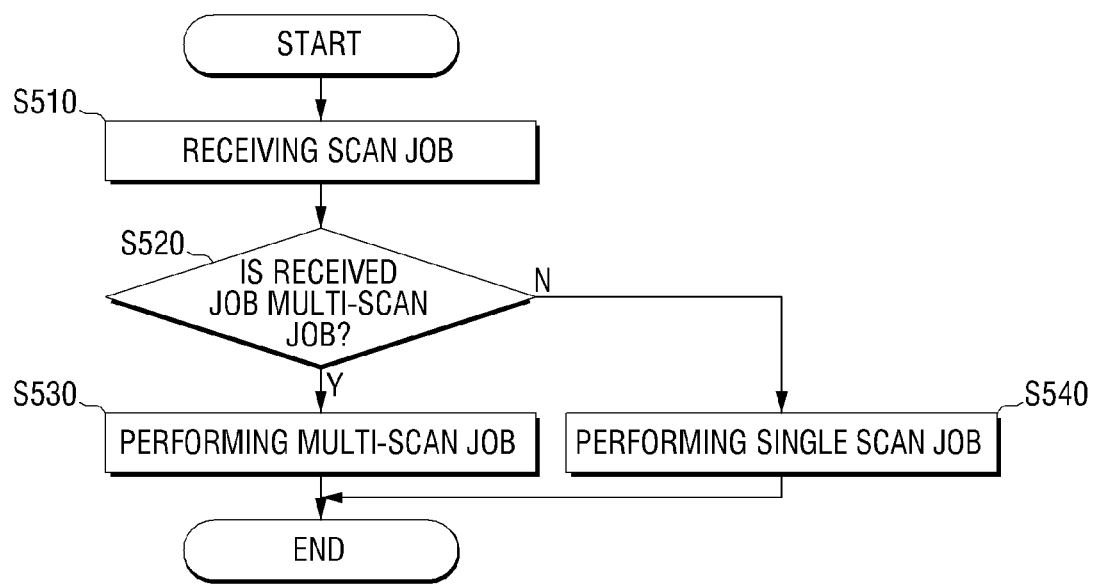
FIG. 5 is a flowchart illustrating an image scanning method according to an exemplary embodiment of the present general inventive concept.

FIG. 5 is a flowchart illustrating an image scanning method according to an exemplary embodiment of the present general inventive concept.

Referring to FIG. 5, if a new scan job is input in operation S510, it is determined whether the input scan job is a multi-scan job or not in operation S520. More specifically, in the process of performing a scan job using one of a plurality of scan units, if at least one other scan job is input, or if a user selects one of multi-scan jobs that can be provided by the image scanning unit 100, the input scan job is determined to be a multi-scan job. Practically, information indicating whether the input scan job is a multi-scan job or not is displayed for the user. Herein, the multi-scan job refers to a job that scans different documents by individually controlling a plurality of scan units. For example, in the process of performing a scan job using a flatbed, a new scan job, a new fax transmission job, or a new copy job using an ADF is regarded as a multi-scan job.

If the input scan job is not a multi-scan job as determined at operation S520, one of the plurality of scan units is controlled to perform the input scan job in operation S540. More specifically, if the input scan job is not a multi-scan job, that is, if there is no scan job which is being currently performed or if the input scan job requires the same scan unit (for example, if the currently input scan job requires the second scan unit 150 which is currently in the process of performing a job), one of the plurality of scan units 140, 150 is controlled to perform a single scan operation.

If the input scan job is a multi-scan job as determined at operation S520, the multi-scan job is performed individually using a plurality of scan units in operation S530. More specifically, in the process of performing a scan job using the first scan unit 140, if a new scan job is input, the new scan job is performed by the second scan unit 150 in parallel with the scan job of the first scan unit 140. If the user selects a pre-defined multi-scan job that can be provided by the image scanning apparatus 100, the first and the second scan units 140, 150 scan different documents in parallel with each other.

At least one of scan data scanned by the plurality of scan units 140, 150 may be printed. More specifically, if the new input scan job is a copy job or a pre-defined scan job which needs to be output, the scanned scan data may be printed. Practically, scan data scanned by one of the plurality of scan units 140, 150 is printed on one side of a printing medium and scan data scanned by at least one of the other scan units is printed on the other side of the printing medium such that a double-sided copy is output. Also, scan data scanned by one of the plurality of scan units and scan data scanned by at least one of the other scan units are all printed on a single side of the printing medium. Also, scan data scanned by one of the plurality of scan units is used as a form document and scan data scanned by at least one of the other scan units is copied to the form document in the form of 'ID+Form'.

Accordingly, even when a certain scan job is being currently performed, the user can perform a new scan job without waiting for the completion of the scan job already performed, and also diverse pre-defined multi-scan jobs can be used, so that user's convenience is improved.

The image scanning method of FIG. 5 is executable in a different image scanning apparatus besides the image scanning apparatus of FIG. 1.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image scanning method of an image scanning apparatus which comprises a plurality of scan units, the method comprising:
   receiving a new scan job;
   determining whether the new scan job is a multi-scan job; and
   when the new scan job is a multi-scan job, individually performing the multi-scan job using the plurality of scan units,
   wherein the multi-scan job includes at least one of a scan job, a fax transmission job, and a copy job on a first document of a first type which uses an automatic document feeder (ADF) while performing another scan job on a different document of a second type using a flatbed scanner.

2. The image scanning method of claim 1, wherein the receiving the new scan job comprises:
   receiving at least one of the scan job, the fax transmission job, and the copy job which uses the ADF while performing another scan job using the flatbed scanner.

3. The image scanning method of claim 1, wherein the determining comprises:
   in performing a scan job using one of the plurality of scan units, when at least one different scan job is received or if a multi-scan job which can be provided by the image scanning apparatus is selected, determining that the new scan job is a multi-scan job.

4. The image scanning method of claim 1, further comprising:
   displaying information indicating whether the new scan job is a multi-scan job for a user.

5. The image scanning method of claim 1, further comprising:
   printing at least one of scan data that is scanned by the plurality of scan units.

6. The image scanning method of claim 5, wherein the printing comprises:
   printing scan data that is scanned by one of the plurality of scan units on one side of a printing medium and printing scan data that is scanned by at least one of the other scan units on the other side of the printing medium.

7. The image scanning method of claim 5, wherein the printing comprises:
   printing scan data that is scanned by one of the plurality of scan units and scan data scanned by at least one of the other scan units on a single side of a printing medium.

8. The image scanning method of claim 7, wherein the printing comprises:
   obtaining scan data that is scanned by one of the plurality of scan units as a form document; and
   printing an ID for the scan data that is scanned by at least one of other scan units on the form document.

9. An image scanning apparatus comprising:
   a plurality of scan units;
   a user interface to receive a new scan job; and
   a controller to determine whether the new scan job is a multi scan job and to individually perform the multi-scab job using the plurality of scan units,
   wherein the multi-scan job comprises at least one of a scan job, a fax transmission job, and a copy job on a first document of a first type which uses an automatic document feeder (ADF) while performing another scan job on a different document of a second type using a flatbed scanner.

10. The image scanning apparatus of claim 9, wherein the user interface receives from a user at least one of the scan job, the fax transmission job, and the copy job which uses the ADF while performing another scan using the flatbed scanner.

11. The image scanning apparatus of claim 9, wherein performing a scan job using one of the plurality of scan units comprises:
    when at least one different scan job is received or when a multi-scan job is provided by the image scanning apparatus is selected, the controller to determine that the new scan job is a multi-scan job.

12. The image scanning apparatus of claim 9, wherein the user interface displays information indicating whether the new scan job is a multi-scan job.

13. The image scanning apparatus of claim 9, wherein the controller controls at least one of scan data that is scanned by the plurality of scan units to be printed.

14. The image scanning apparatus of claim 13, wherein the controller controls scan data that is scanned by one of the plurality of scan units to be printed on one side of a printing medium and controls scan data scanned by at least one of the other scan units to be printed on the other side of the printing medium.

15. The image scanning apparatus of claim 13, wherein the controller controls scan data that is scanned by one of the plurality of scan units and scan data that is scanned by at least one of the other scan units to be printed on a single side of a printing medium.

16. The image scanning apparatus of claim 15, wherein the controller controls scan data that is scanned by one of the plurality of scan units to be used as a form document and controls an ID for scan data that is scanned by at least one of other scan units to be printed on the form document.

* * * * *